Feb. 18, 1969 R. A. AZIZ 3,428,904

DATA DETECTOR FOR MAGNETIC STORAGE DEVICE

Filed June 24, 1966

INVENTOR.
RAHMAT A. AZIZ

BY Robert B. Crouch
ATTORNEY

United States Patent Office 3,428,904
Patented Feb. 18, 1969

3,428,904
DATA DETECTOR FOR MAGNETIC STORAGE DEVICE

Rahmat A. Aziz, San Jose, Calif., assignor to International Business Machines Corporation, Armonk, N.Y., a corporation of New York Filed June 24, 1966, Ser. No. 560,244
U.S. Cl. 328—110 7 Claims
Int. Cl. H03k 5/20

ABSTRACT OF THE DISCLOSURE

In the detection circuit of a digital data processing system employing double frequency modulation, a variable frequency oscillator (VFO) is phase locked to input clock and data signals. The detection circuit which serves to separate the data from clock pulses, includes a data gate generator responsive to and operating in synchronism with the VFO, a binary trigger that produces full period and half period clock pulse trains, and a three input AND gate responsive to the trigger and gate generator.

The present invention relates to storage of digital information on magnetic surfaces and more particularly to an improved means for readout of digital information which has been recorded with a frequency-modulation technique.

In data storage machines information is translated into a machine readable form and then recorded as a sequence of digits on a magnetic surface of a suitable storage medium, such as tape, drum, disk, etc. The information is stored in the magnetic surface as a flux reversal, i.e. a step-like change in magnetization from one remanent state of saturation of the recording medium to the opposite state. The flux reversals, or bits, as they are known, are recorded and read out in a timed sequence in synchronism with a series of regularly occurring clock signals. The frequency with which the clock signals occur determines the rate at which the digits are recorded in, or read from, the magnetic surface and also defines the clock interval, that is, the unit of time allotted for the recording or read out of a single digit.

The frequency modulation, or double frequency, recording technique is one in which a clock bit occurs regularly during each clock interval and an additional data bit is either present or absent, depending upon the binary value of data recorded during a particular clock interval. This technique can also be defined as one in which data of a first binary value is indicated by a single bit during a clock interval and data of the second binary value is indicated by two bits within a clock interval. To facilitate the read-out process, it is desirable to achieve the maximum time separation, i.e., one half the clock interval between adjacent bits. This, in practice, results in a clock bit at the beginning of every clock interval and a data bit at the midpoint of each clock interval having a second binary value.

The readout process of frequency modulation recorded signals requires identification of an individual bit as either clock or data, then separation of the data from the clock, and finally synchronization of one with the other. This process is complicated by defects in the magnetic surface which may cause some of the recorded bits to drop out, and by bit shift, i.e. the fact that bits may be shifted from their assigned locations in an irregular manner. With a magnetic surface subject to imperfections or defects, particularly flexible media such as tape, the possibility of dropped bits, either clock or data, makes it impractical to rely upon the separated clock bits in detecting the recorded data bits or in controlling the flow of data from the magnetic surface to a control unit. In addition the fact that both the amount and direction of bit shift are variable, depending upon the pattern of bits recorded, gives rise to the possibility of confusion between clock bits and data bits or vice-versa.

The object of the present invention is to provide an improved readout means for reliably detecting recorded data bits in spite of the maximum anticipated bit shift and which will operate in synchronism with the recorded clock bits while furnishing a regularly occurring sequence of clock signals for controlling the data flow.

The present invention provides an improved data detector for clocking data recorded with a frequency modulation technique and which accommodates a maximum amount of bit shift while operating in synchronism with the recorded data. This is accomplished by means of a variable frequency oscillator, VFO, which is phase-locked with the recorded clock and data signals as read from the recording medium, a binary trigger for producing both a full period clock pulse train and a half period clock pulse train from the VFO output, and a data gate generator operated by the VFO for producing a gating signal which occurs in synchronism with the VFO output and which can be set to accommodate the worst case condition of bit shift, thus ensuring an accurate identification and separation of data signals from clock signals.

The foregoing and other objects, features and advantages of the invention will be apparent from the following more particular description of a preferred embodiment of the invention as illustrated in the accompanying drawings.

Figure 1:
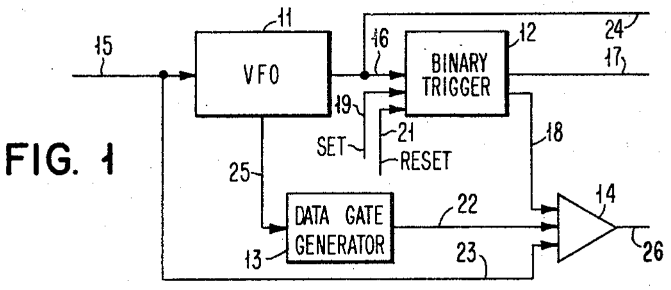
FIG. 1 is a block diagram of the data detector of the present invention.

With the frequency modulation recording technique, the recorded clock pulses in and of themselves carry no information but only define the clock interval. The information is carried by the data pulses, i.e. the presence or absence of a data pulse between adjacent clock pulses indicates the binary value of the information recorded during that clock interval. The amount and the direction of bit shift depends upon the particular bit pattern recorded and may vary from clock interval to clock interval. The amount of bit shift is at a minimum for a sequence of clock intervals at a single binary value, i.e., a uniform sequence of alternating clock bits and data bits, or a sequence of clock bits alone. The maximum amount of bit shift occurs in connection with clock bits and results when different binary values are recorded in adjacent clock intervals. By way of an example, reference may be had to the bit pattern shown in the wave forms of FIG. 2. With this pattern the second and third clock bits, since they are not separated by a data bit, will both be shifted towards each other. Similarly the two data bits of the pattern will be shifted in the same direction, but by a smaller amount, as the adjacent shifted clock bits. It should thus be apparent that both the direction and the amount of bit shift will vary from clock interval to clock interval, depending on the bit pattern recorded. However, it can be generally stated that the greatest amount of bit shift will occur in connection with clock bits rather than with data bits.

A file control unit is usually provided to control the orderly flow of data to and from the storage device. The detector of the present invention is usually incorporated in the file control unit where it receives the read signals from the storage device. In the detector the clock and the data signals are identified and then the data signals are separated and gated out onto a data line. At the same time a 2F clock pulse train, i.e., a pulse at both the leading edge and midpoint of each bit cell period, is generated in synchronism with the raw read signals. This 2F clock pulse train, and a 1F clock pulse train which is generated from it, are used for all file control functions during a read operation. This detector provides the capability of distinguishing the data bits from the clock bits regardless of the order in which they appear. Usually with the double frequency recording technique, the clock bits are recorded at the leading edge of each bit cell period and the data bits are recorded at the midpoint of the periods. However, it may be desirable in some instances to reverse this procedure and record the data bits at the leading edge of the bit cell. Provision is made in the present detector for accommodating this situation. Since the present detector operates in synchronism with the recorded data, it accommodates variations in the rate of relative movement between the recording medium and the read/write transducer. This detector also avoids the problem associated with dropped bits by providing a generated clock rather than using the separated clock signals to advance the control unit registers.

Referring to FIG. 1 of the drawing the detector of the present invention includes a variable frequency oscillator 11, the output of which is connected to a binary trigger 12. A data gate generator 13 is connected between the VFO 11 and a three-input And gate 14. The VFO includes a ramp generator and an error detector and is phase-locked with the raw read signals delivered along line 15. The output of the ramp generator and the raw read signals are compared in the error detector and the frequency of the ramp generator adjusted, so that each bit on line 15 falls nominally at the midpoint of the ramp. If the bits begin to fall before the midpoint of the ramp, it is an indication that the rate of relative movement between the recording medium and the transducer is increasing. The error detector then signals the ramp generator to increase its frequency. Conversely, if the bits begin to fall after the midpoint of the ramp, the error detector signals the ramp generator to decrease its frequency. Due to filtering in the VFO circuits, instantaneous frequency shifts due to bit shift are averaged out, and the derived clock frequency is the same as the write clock frequency modified by the change in the relative rate of movement between the recording medium and the transducer. VFO circuits of this general type are well known in the data recording art, see for instance, U.S. Patent 3,197,739 issued to E. G. Newman on July 27, 1965.

The binary trigger 12 is a conventional bistable multivibrator having a 2F input on line 16 and a pair of complementary 1F outputs on lines 17 and 18. Trigger set and reset lines 19 and 21 are provided to permit selection of a desired state of the trigger. The data gate generator 13 includes a pair of threshold detectors, one positive and one negative, and a negative And gate.

Figure 2:
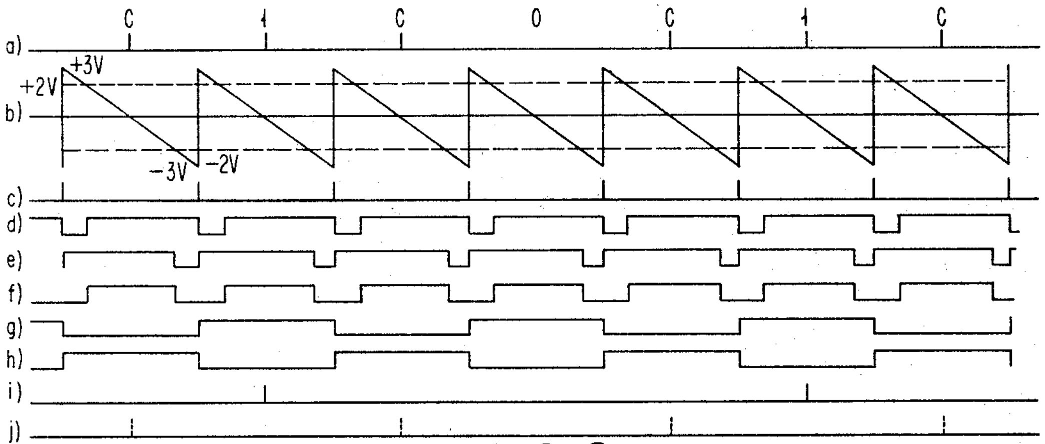
FIG. 2 is a series of wave forms developed in various portions of the circuitry of FIG. 1.
Figure 3:
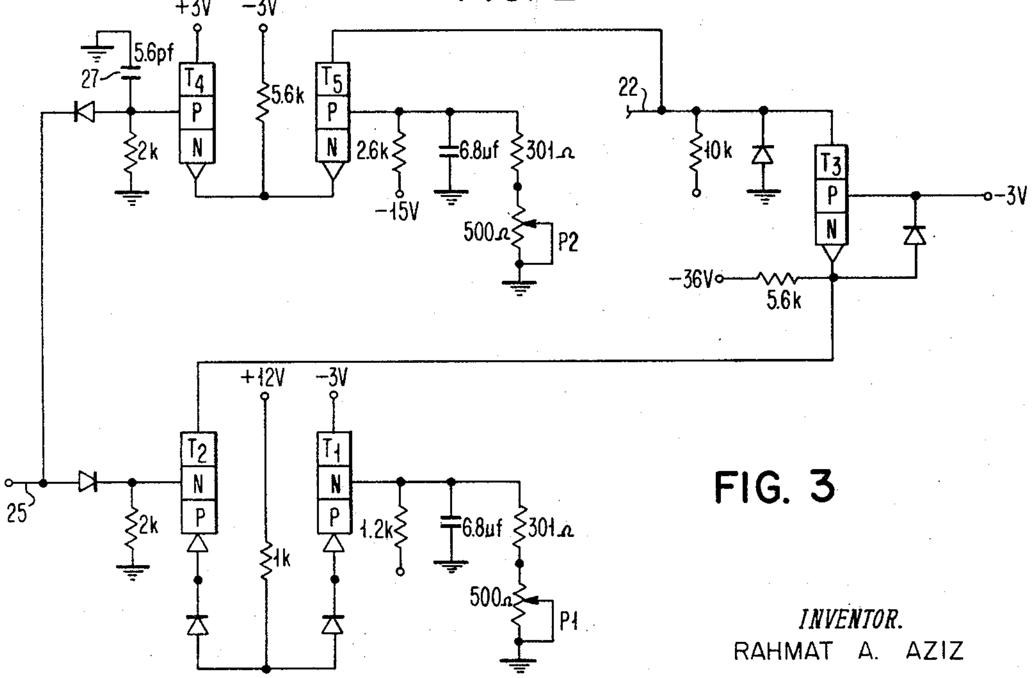
FIG. 3 is a circuit diagram of the data gate generator of FIG. 1.

In the operation of the present invention, as shown in FIG. 2 of the drawings, the bit pattern of wave form *a*, is applied along line 15 to the VFO 11. This bit pattern, which consists of a series of clock and data pulses is an idealized representation of the raw read signals which are read out of the storage medium. The negative going ramp of wave form *b* is generated within the VFO. For the purpose of this illustration the ramp is illustrated as extending from plus 3 volts to a minus 3 volts, but these limits may vary depending upon the particular application of the detector. The frequency of the VFO is constantly adjusted, so that the pulses of wave form *a* will fall at the midpoint of the ramp of wave form *b*. Where there is no pulse in wave form *a*, either in the case of a binary zero or where a clock or data pulse may have been dropped due to imperfections in the recording surface, etc., the ramp of wave form *b* will continue at its established frequency. The output of the VFO on line 16, as shown in wave form *c* is a series of pulses derived from the ramp of wave form *b* and occurring at the frequency of the ramp, that is, twice the clock frequency. This output is taken off on line 24 as a 2F clock pulse train and used for various timing functions within the file control unit. The signals of wave form *c* are counted down in the binary trigger 12 to form a full period clock pulse train, wave form *h*, which is delivered along line 17 where it is used to strobe the data through the file control unit. The ramp of wave form *b* is transmitted along line 25 to the data gate generator 13. The positive and negative threshold detectors of the data gate generator are set at a level of plus 2 volts and minus 2 volts, respectively. As shown in wave form *d* the signal level of the positive threshold detector is dropped when the ramp reaches plus 2 volts during flyback and stays down until the voltage level of the ramp drops below positive 2 volts. The signal level of the negative threshold detector, wave form *e* is dropped when the ramp reaches a level of minus 2 volts and stays down until the ramp voltage again rises above minus 2 volts during flyback. Referring to FIG. 3 the ramp of wave form *b* is illustrated as being applied to both the threshold detectors. Transistors T2 and T4 will normally be on, while transistors T1 and T5 will be turned on when the ramp has reached the positive and negative threshold levels which are set at the base of T1 and T5 respectively by potentiometers P1 and P2 respectively. Capacitor 27 discharges during the flyback of the ramp generator and delays the raising of the signal level of wave form *e*. This in effect stretches the negative going excursion of wave form *e* to overlap that of wave form *d*, thus ensuring that the signal level of wave form *f* will remain low continuously from the time it is dropped by wave form *e* until it is raised by wave form *d*. This ensures that there will be no data output from the detector during the flyback time of the ramp. As indicated, wave forms *d* and *e* are combined in a negative And gate to form a data gate signal, wave form *f*, which is delivered along line 22 to And gate 14. Other inputs to the And gate 14 are the read data along line 23 and one side of the trigger output wave form *g*. And gate 14 will pass only those pulses of wave form *a* which occur when the signal level of both wave forms *g* and *f* are high. This situation occurs only after the occurrence of one clock pulse of wave form *a* and before the occurrence of the next. Accordingly, any data pulses which occur on wave form *a* will be gated through on to data line 26 as indicated in wave form *i*. Clock pulses occurring on wave form *a* will not be gated through And gate 14 since they occur when the signal level of wave form *g* is down.

With the set and reset lines of trigger 12, either stable state of the trigger can be selected. By pulsing set line 19 the trigger can be flipped so that wave form *h* appears on line 18 rather than wave form *g*. In this situation, since wave form *h* is the complement of wave form *g* the clock signals will be gated through the And gate onto the data line 26 rather than the data signals. This capability can be important with relation to the format signals such as beginning of record, end of record, or etc. This means that with an 8-bit code, for instance, all 256 possible bit combinations are available for data identification and at the same time an equal number of characters or bit combinations, are available for record identification, i.e. formatting. In this format mode the data bit would be recorded during each clock interval and a clock bit would be recorded or omitted, depending upon the particular pattern or character to be recorded. After the format signals are recorded, the reset line 21 would be pulsed and the trigger 12 flipped to its opposite state for recording of information in the data mode. When format signals are desired to be read the set line is again pulsed and the trigger flipped to the format mode until the format signals, waveform *j*, are located and read. At that time the reset line is again pulsed and the trigger flipped back to the data mode, so that the recorded data can then be read out.

With the present detector the data gate signal of wave form *f* can be fitted around the anticipated pulses of wave form *a*, since both the leading and trailing edges of the data gate can be adjusted independently. Thus both the width and the position of the data gate can be adjusted, by means of potentiometers P1 and P2, to accommodate the maximum amount of bit shift.

While the invention has been particularly shown and described with reference to a preferred embodiment thereof, it will be understood by those skilled in the art that various changes and modifications may be made without departing from the spirit and scope of the invention.

What I claim is:

1. Detection means for recovering information from a frequency modulated recording wave form having a regularly occurring clock signal during each clock interval having a first binary value and a data signal occurring during a clock interval having a second binary value, comprising:

means for generating a first continuously reoccurring signal in synchronism with the clock and data signals of the wave form;

means for developing a data gate signal from the continuously reoccurring signal;

means connected to the first named means for developing a second continuous signal from the first continuously reoccurring signal, the second signal occurring at a regular frequency of one-half that of the first signal; and means for combining the frequency modulated wave form, the data gate signal and the second continuous signal to separate the data signals of the wave form from the clock signals thereof.

2. Detection means as set forth in claim 1 including means for selecting either the signal of the first binary value or of the second binary value in a clock interval of the frequency modulated wave form as the data signal to be separated.

3. Detection means as set forth in claim 1 including means for synchronizing the second continuous signal with either the signal of the binary value or of the second binary value in a clock interval of the frequency modulated waveform to allow separation of either signal of the waveform as the data signal.

4. Detection means as set forth in claim 1 in which the data gate signal has both a leading and a trailing edge, the means for developing the data gate signal including means for adjusting the width of the signal within a clock interval to accommodate bit shift in the frequency modulated wave form.

5. Detection means as set forth in claim 4 which includes means for adjusting the position of the leading edge of the data gate signal relative to the clock signal of each clock interval.

6. Detection means as set forth in claim 4 which includes means for adjusting the position of the trailing edge of the data gate signal relative to the clock signal of each clock interval.

7. Detection means as set forth in claim 4 which includes means for adjusting both the leading and trailing edges of the data gate signal relative to the clock signal of each clock interval.

No references cited.

ARTHUR GAUSS, *Primary Examiner.*

JOHN ZAZWORSKY, *Assistant Examiner.*

U.S. Cl. X.R.

307—232; 340—172.5; 328—119